No. 782,373. PATENTED FEB. 14, 1905.
G. W. WHITCOMB.
STALK CUTTER.
APPLICATION FILED SEPT. 19, 1903.
3 SHEETS—SHEET 3.
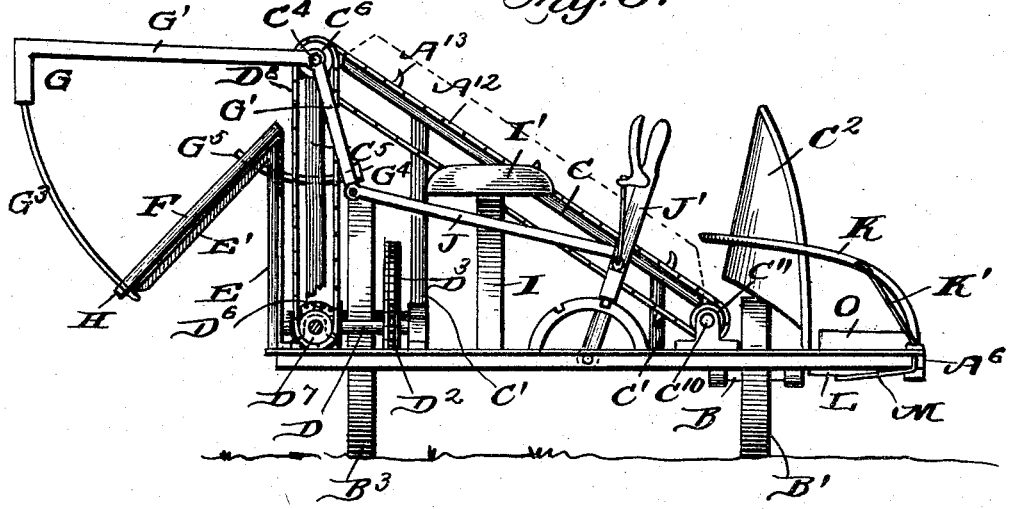
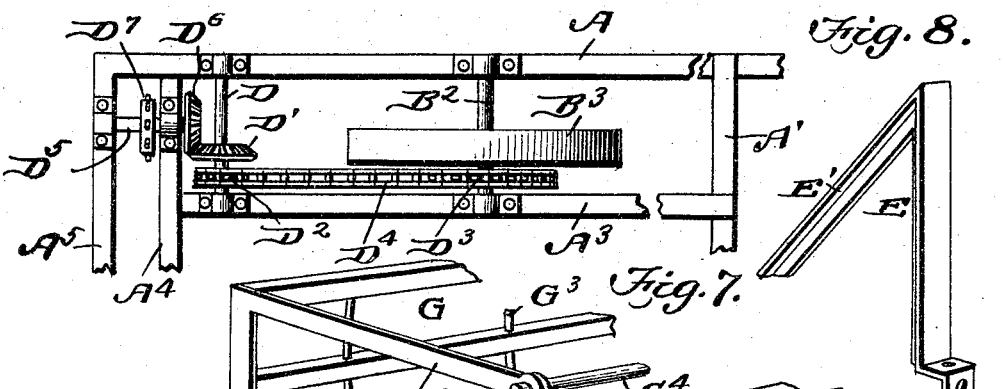
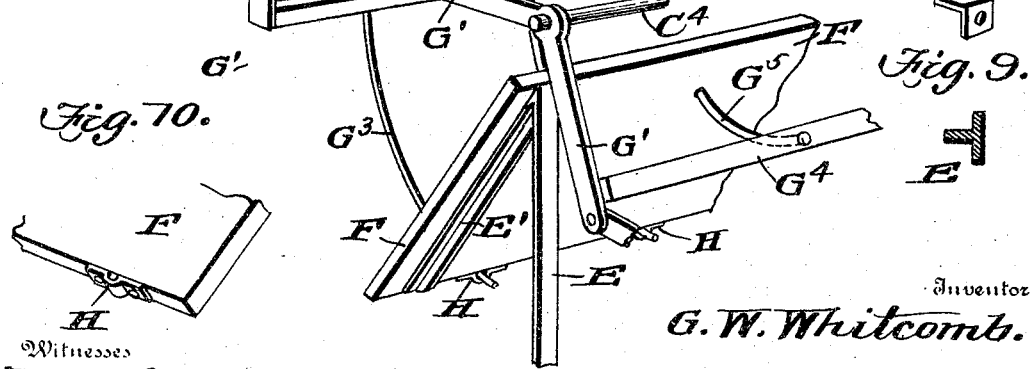
Witnesses
M. D. Blondel
Clarence Shaw
Inventor
G. W. Whitcomb.
By Munn & Brock
Attorneys No. 782,373.                                      Patented February 14, 1905.

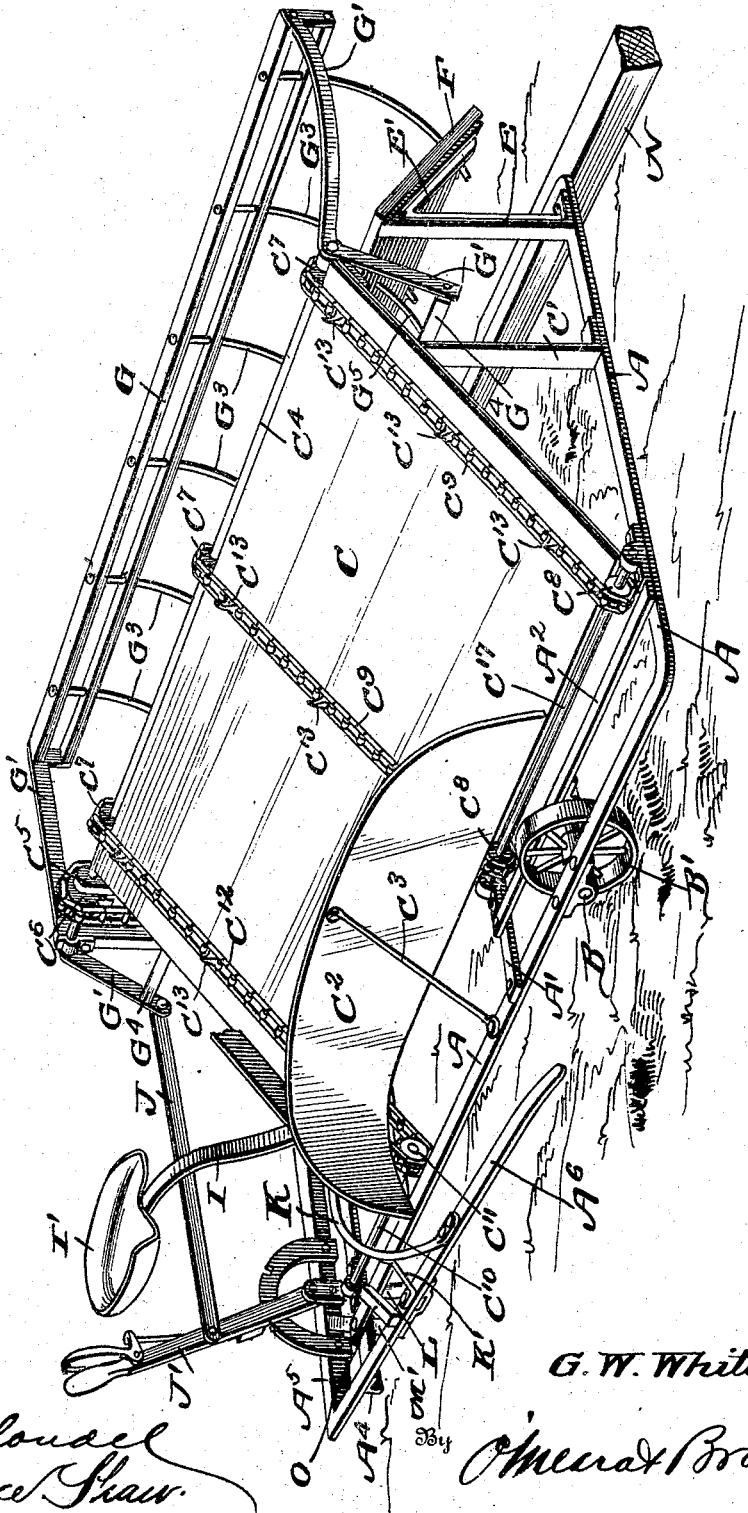

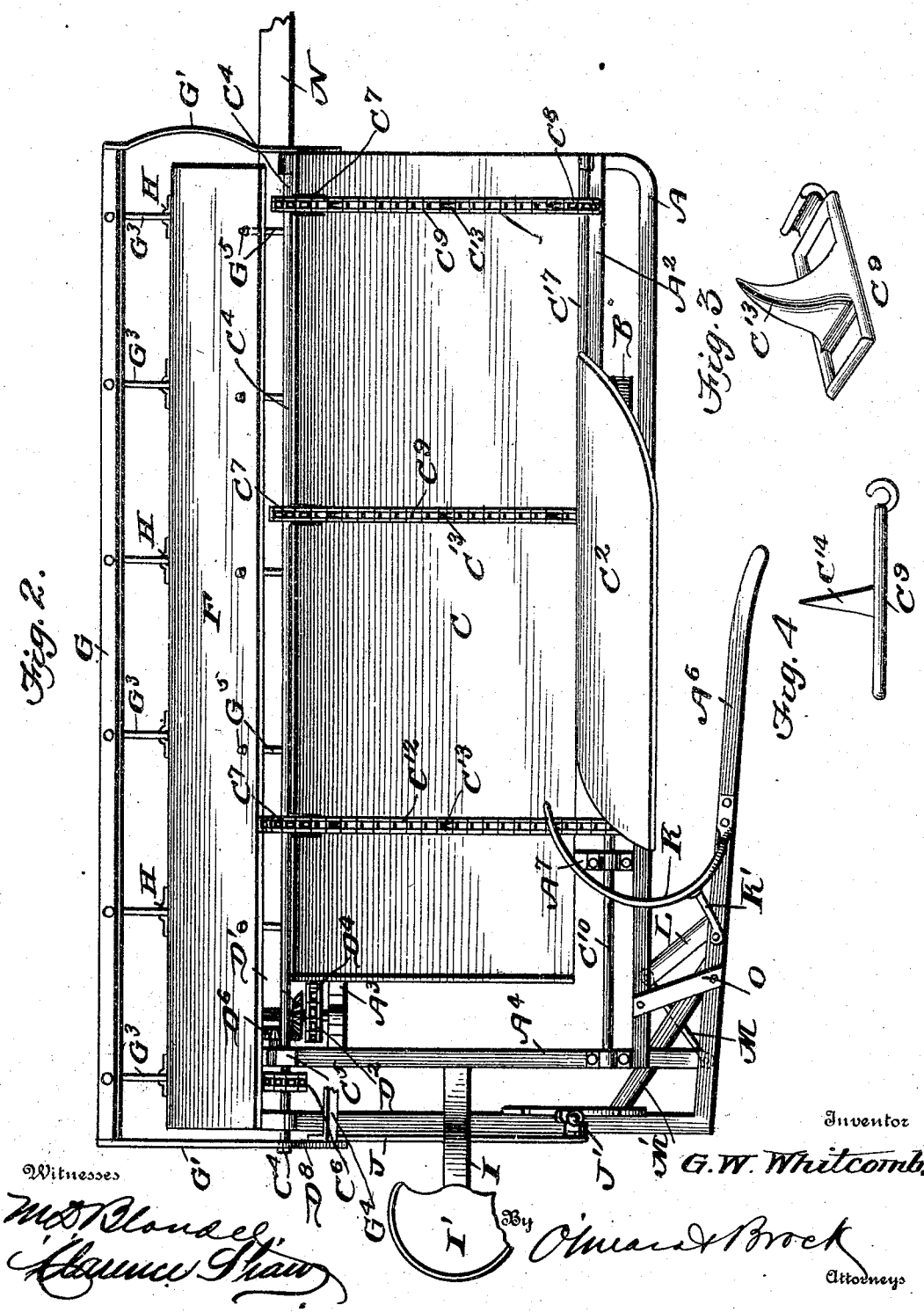

UNITED STATES PATENT OFFICE.

GEORGE W. WHITCOMB, OF BUTKA, NEBRASKA.

STALK-CUTTER.

SPECIFICATION forming part of Letters Patent No. 782,373, dated February 14, 1905.

Application filed September 19, 1903. Serial No. 173,876.

*To all whom it may concern:*

Be it known that I, GEORGE W. WHITCOMB, a citizen of the United States, residing at Butka, in the county of Rock and State of Nebraska, have invented a new and useful Stalk-Cutter, of which the following is a specification.

My invention is an improvement in stalk-cutters, and has for its object the cutting of stalks, such as corn, cane, &c.

A further object is to provide means whereby the stalks cut are formed into loose bundles and such bundles dropped to one side of the cutter at the pleasure of the operator.

My invention consists of the novel features of construction and combination of parts hereinafter described, particularly pointed out in the claims, and shown in the accompany drawings, in which—

Figure 1 is a perspective view of my device complete. Fig. 2 is a plan view of the device. Fig. 3 is a perspective view of the preferred form of hook carried by the sprocket-chains. Fig. 4 is a side elevation of a modified form of hook. Fig. 5 is a rear elevation of my device, a part being broken away, and a shaft shown in section. Fig. 6 is a detail plan view showing the gearing for driving the mechanism used in elevating the stalks. Fig. 7 is a perspective detail view of construction, showing the rear end of the bundle-carrier and one of the fingers carried by the movable frame. Fig. 8 is a perspective view of one of the braces. Fig. 9 is a cross-section of the brace. Fig. 10 is a perspective view showing one of the finger-guides.

In constructing my cutter I employ a substantially open rectangular metallic frame A. A transverse brace-bar $A'$ is secured to the sides of the frame. A bar $A^2$ is secured at its front end to the front end of the frame A and at its rear end to the bar $A'$. A stub-axle B is journaled at one end in bearings carried by a side of the frame and at the opposite end in bearings carried by the bar $A^2$. On this axle, which is nearer the front of the frame than the rear, is a grain-wheel $B'$. A bar $A^3$ is secured at one end to the rear of the frame and at the opposite end to the bar $A'$, and in bearings carried by a side of the frame and the bar $A^3$ is journaled a stub-axle $B^2$, on which is mounted a bull-wheel $B^3$. At its rear the frame A has two parallel end pieces $A^4$ and $A^5$ in practically the same plane and both extending beyond the side of the frame A in which the grain-wheel axle is journaled. Connecting the projecting ends of the end pieces $A^4$ and $A^5$ and extending forwardly in the plane of the frame A, but diverging therefrom, is a stalk-guide $A^6$.

Mounted on the frame A is an inclined platform C, supported by the standard $C'$. The lower edge of this platform is parallel and adjacent to the grain side of the cutter-frame A, its upper edge being substantially above and parallel with the opposite side of the frame. Secured to this side of the frame at a point adjacent the rear edge of the platform C is the rear end of a shield $C^2$. This shield is curved inwardly and forwardly, and its top and bottom edges are upwardly and forwardly curved, and the shield is also longitudinally curved outwardly overhanging the grain-wheel $B'$. The central and forward portions of this shield extend over and clear of the lower edge of the inclined platform. The shield is supported by a brace-rod $C^3$, secured at its lower end to the side of the frame A. The upper edge of the platform C carries a bracket at its front end, in which is journaled the front end of a shaft $C^4$, its rear portion being journaled in an upright $C^5$, and on the rear end of the shaft is a sprocket-wheel $C^6$, while intermediate its ends are three sprocket-wheels $C^7$, arranged adjacent the upper edge of the platform C. Parallel with the lower edge of the platform C is a shaft $C^{17}$, journaled at one end in bearings in the frame A and at the opposite end in bearings on the brace-bar $A'$. This shaft carries two sprocket-wheels $C^8$, and sprocket-chains $C^9$ run around these wheels and the two forward sprocket-wheels $C^7$, the chains passing over and under the platform C. A short idle shaft $C^{10}$ is journaled in bearings in the end of the frame and also in bearings carried by a cross-piece $A^7$. This shaft carries an idle sprocket-wheel $C^{11}$, over which runs a sprocket-chain $C^{12}$, the chain also running over the rear sprocket-wheel $C^7$. It will be also understood that the shaft $C^{17}$ is an idle shaft. These sprocket-chains carry hooks $C^{13}$, having a curved point, as shown in Fig. 3, though a wedge-shaped hook $C^{14}$, as shown in Fig. 4, can be used, as preferred. To drive the sprocket-chains, the following mechanism is employed. A stub-shaft D is journaled in the rear of the bull-wheel, and on this shaft are fixed a beveled gear-wheel $D'$ and a sprocket-wheel $D^2$. A sprocket-wheel $D^3$ is fixed on the shaft $B^2$, and a sprocket-chain $D^4$ runs over the wheels $D^2$ and $D^3$, driving the shaft D and beveled gear $D'$. A stub-shaft $D^5$ is journaled in the end pieces $A^4$ $A^5$ of the frame and at a right angle to the shaft D. A beveled gear $D^6$ is fixed on the shaft $D^5$ and meshes with the beveled gear $D'$. A sprocket-wheel $D^7$ is fixed on the shaft $D^5$, and a sprocket-chain $D^8$ runs from this wheel $D^7$ to and over the wheel $C^6$.

Mounted on the side of the frame A to the rear of the platform C are standards E, preferably of T-shaped iron. The standards have an integral downwardly and outwardly extending arm $E'$, forming of the standard a bracket, as shown in Fig. 8. Carried by the arms $E'$ is a platform F, its upper edge being adjacent but below the upper edge of the platform C and the two platforms being inclined in opposite directions. A narrow rectangular frame G has arms $G'$ projecting from its ends, the arm at the forward end being slightly curved, and the ends of these arms are loosely pivoted to the ends of the shaft $C^4$. Downwardly and inwardly curved fingers $G^3$ are secured in the frame G, and when the frame is in its normal position, as shown in the drawings, these fingers extend below the lower edge of the platform F, fitting in guide-brackets H. (Shown in detail in Fig. 10.) When in this normal position, the platform F and fingers $G^3$ combine to form the sides of a V-shaped trough. To provide for raising the frame G, and thus lifting the fingers, the rear arm $G'$ is cranked, and to the free end of this cranked portion an end of a link-bar J is pivoted, the opposite end of the bar being pivoted to a lever $J'$, which is pivoted in turn at its lower end to the rear end piece $A^5$. This lever works over the usual quadrant engaged by a pawl pivoted to the lever and released by the hand in the usual way. Adjacent the lever $J'$ a seat-bracket I, of the usual construction, is secured to the end piece $A^4$ and carries a seat $I'$. The forward curved arm $G'$ is also cranked or angled, extending downwardly from the shaft $C^4$ parallel to the cranked portion of the arm $G'$ at the rear end of the machine. These two cranked portions are connected by a bar $G^4$, and this bar has upwardly and outwardly curved fingers $G^5$, which project through apertures formed in the platform F. When the fingers $G^3$ are raised, the fingers $G^5$ project and form a ledge, which catches the stalks that fall on the platform F while the fingers $G^3$ are up and prevents the stalks from sliding down and being impaled by the fingers $G^3$ when the latter descend. When the fingers $G^3$ return to their normal position, the fingers $G^5$ are retracted and the stalks drop to the fingers $G^3$.

On the stalk-guide $A^6$ is mounted a supplemental or turning guide K. This guide curves upwardly and inwardly and forwardly, curving inwardly toward the platform C, around and substantially parallel with the rear end of the shield $C^2$, but spaced from same. A brace $K'$ braces the turning-guide K. Arranged just to the rear of the guide K is a cutting-blade L, one end of the blade being fastened to the guide $A^6$ and the opposite end to the side of the frame A, this inner end being to the rear of its opposite or outer end. Suitable braces M $M'$ are used to strengthen this portion of the machine. A tongue N is secured to the frame A on the bundle-carrier side. A block O is arranged in the rear of the blade L to prevent the stalks from sliding lengthwise over the blade.

The operation of my device is as follows: The machine is driven along the row of corn or cane stalks to be cut, the shield $C^2$ traveling along one side of the row, the guide $A^6$ on the opposite side, and the turning-guide K straddling the row. As the turning-guide K reaches the stalks, which are held between the guide $A^6$ and the shield, they will be bent forward and toward the platform C and when reached and cut by the knife will fall on said platform, the turning-guide carrying the lower ends of the stalks around the rear end of the shield $C^2$ and onto the chain $C^{12}$. The chain $C^{12}$ is longer than the chain $C^9$ and is geared to travel faster than the chains $C^9$, as it will be obvious that in cutting corn, for example, the light tassel ends will fall on the platform and commence upward travel on the forward chain $C^9$ before the lower portion of the stalk has been guided to position on the chain $C^{12}$. To remedy this and have the stalks fall into the bundle-carrier horizontally, the sprocket-chain $C^{12}$ travels over larger sprocket-wheels than the chain $C^9$. As the stalks pass over the platform C, they fall into the bundle-carrier formed by the platform F and fingers $G^3$ and collect until a bundle of the desired size is formed. The operator, who is also the driver, then pulls the lever J toward him and the frame G is lifted, raising the fingers $G^3$ and allowing the stalks to fall to the ground. The frame is then permitted to fall back into its normal position, and a new bundle is cut and collected and then dumped in the same way.

Having thus fully described my invention, what I claim as new, and desire to secure by Letters Patent, is—

1. A device of the kind described comprising oppositely-inclined platforms, endless chains traveling over the first platform and adapted to throw stalks over upon the second, guide-brackets carried by the lower edge of the second platform, a frame pivotally supported above the second platform and having curved fingers normally engaging the guide-brackets, and means for lifting the frame and drawing the fingers out of engagement with the said brackets.

2. A device of the kind described comprising a frame, the inclined platforms C, and F, arranged on said frame, conveyer-chains traveling over the platform C, a movable frame arranged above the platform F, guide-brackets, secured to the lower edge of the platform F, curved fingers carried by the movable frame and having their ends engaging the guide-brackets, means for actuating the conveyer-chains, means for guiding stalks to said chains, and means for lifting the movable frame, substantially as described.

GEORGE W. WHITCOMB.

Witnesses:
 JAMES PIERCE,
 HENRY O. PIERCE.